No. 653,912. Patented July 17, 1900.
D. HEGGIE.
COUPLING AND RING.
(Application filed Oct. 14, 1899.)
(No Model.)
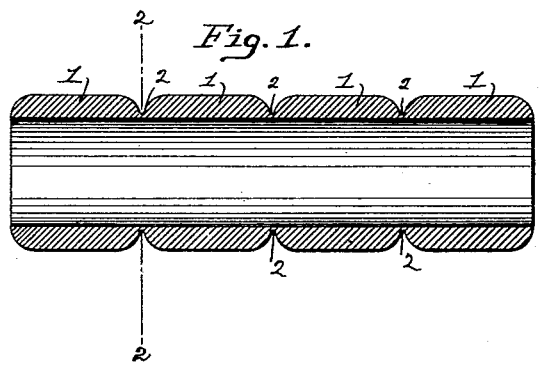
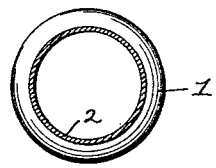
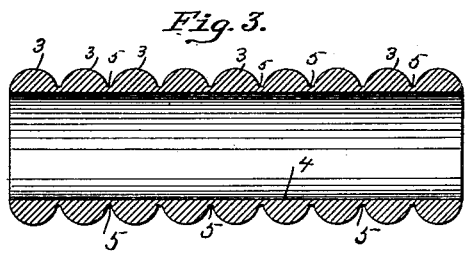
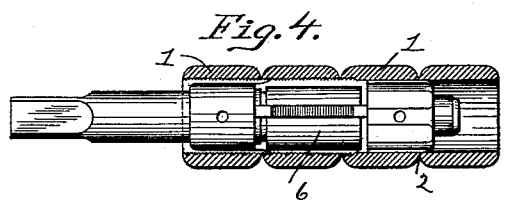
Witnesses:
Inventor:

UNITED STATES PATENT OFFICE.

DAVID HEGGIE, OF McKEESPORT, PENNSYLVANIA, ASSIGNOR TO THE NATIONAL TUBE COMPANY, OF NEW YORK, N. Y., AND PITTSBURG, PENNSYLVANIA.

COUPLING AND RING.

SPECIFICATION forming part of Letters Patent No. 653,912, dated July 17, 1900.

Application filed October 14, 1899. Serial No. 733,596. (No model.)

*To all whom it may concern:*

Be it known that I, DAVID HEGGIE, a resident of McKeesport, in the county of Allegheny and State of Pennsylvania, have invented a new and useful Improvement in Couplings and Rings; and I do hereby declare the following to be a full, clear, and exact description thereof.

My invention relates to pipe-couplings, thread-protectors, and like rings adapted to be provided with threaded interior faces; and it consists, as a new article of manufacture, in a tubular body composed of a series of such rings having thick body portions connected by thin webs corresponding substantially in thickness to the depth of the threads to be formed in the rings.

To enable others skilled in the art to understand my invention, I will describe the same more fully, referring to the accompanying drawings, in which—

Figure 1 is a longitudinal cross-section of such an article composed of a series of pipe-couplings. Fig. 2 is a cross-section on the line 2 2, Fig. 1. Fig. 3 is a longitudinal section of such welded band composed of a series of ordinary round rings having flat bases so connected together, and Fig. 4 is a like view showing the separation of the rings in threading.

Like figures of reference indicate like parts in each of the views.

The bands or articles of manufacture forming the subject-matter of this invention are produced by the method described in an application made by me of even date herewith, Serial No. 733,595, and by the apparatus of a like application, Serial No. 733,597, and it is not considered necessary to describe the steps in the manufacture of the same.

In Fig. 1 the band is composed of the several thick rings 1, suitable for forming pipe-couplings or thread-protectors connected by the thin webs 2, the rings having finished outer and inner faces, except at the points where they are connected together. Four such rings are shown together, the rings being connected by the thin webs 2.

In Fig. 3 the ordinary circular rings 3, having flat inner face 4, are connected by the thin webs 5, these webs corresponding substantially in thickness to the depth of threads to be formed on the inner faces of the rings. The invention is the same in either case. The rings connected in this way have special advantages in storage and handling in addition to the advantage that they can be produced at much less cost, as set forth in said applications of even date herewith. For example, the rings can be stored when so connected together by a single handling of each band or article of manufacture composed of several rings, and they can be properly and evenly piled, so that they occupy but little space, while if it is desired to sever the same into separate rings they can be more easily handled by the workmen in feeding them (in forming such pipe-couplings, thread-protectors, or other rings having threaded inner faces) to the tapping or threading dies at one time instead of requiring the separate feeding of each ring, so that in this way the actual labor in handling is materially reduced. Such threading of the blanks is illustrated in diagrammatic view Fig. 4, showing the threading-dies 6 within the welded band, illustrating how the threading of the couplings composing the band severs them from each other.

What I claim as my invention, and desire to secure by Letters Patent, is—

As a new article of manufacture, a wrought-metal tubular blank for forming pipe-couplings or like rings having threaded inner faces composed of two or more thick body portions connected by thin web portions corresponding substantially in thickness to the depth of the threads to be formed in the rings, substantially as set forth.

In testimony whereof I, the said DAVID HEGGIE, have hereunto set my hand.

DAVID HEGGIE.

Witnesses:
A. Z. NEWLIN,
RICHARD JAMES.